(12) United States Patent
Harcup et al.

(10) Patent No.: US 12,024,293 B2
(45) Date of Patent: Jul. 2, 2024

(54) PASSENGER SEATING ARRANGEMENT

(71) Applicant: ADIENT AEROSPACE LLC, Bothell, WA (US)

(72) Inventors: Anthony Harcup, Virginia Water (GB); Nicholas Lendon, Woking (GB); Andrew Stephen Fereday Williams, London (GB); Edson Manuel Ribeiro Alexandrino, London (GB)

(73) Assignee: Adient Aerospace LLC, Bothell, WA (US)

( * ) Notice: Subject to any disclaimer, the term of this patent is extended or adjusted under 35 U.S.C. 154(b) by 846 days.

(21) Appl. No.: 17/030,289

(22) Filed: Sep. 23, 2020

(65) Prior Publication Data

US 2021/0001987 A1    Jan. 7, 2021

Related U.S. Application Data

(63) Continuation of application No. PCT/EP2018/057549, filed on Mar. 23, 2018.

(51) Int. Cl.
*B64D 11/06* (2006.01)
*B64D 11/00* (2006.01)

(52) U.S. Cl.
CPC ...... *B64D 11/0601* (2014.12); *B64D 11/0605* (2014.12); *B64D 11/064* (2014.12); *B64D 11/0641* (2014.12); *B64D 11/0023* (2013.01); *B64D 11/0606* (2014.12)

(58) Field of Classification Search
CPC ............ B64D 11/0601; B64D 11/0602; B64D 11/0604; B64D 11/0605; B64D 11/0606; B64D 11/064; B64D 11/0641; B64D 11/0023
See application file for complete search history.

(56) References Cited

U.S. PATENT DOCUMENTS

| | | | | |
|---|---|---|---|---|
| 7,721,990 B2 * | 5/2010 | Jaeger | ................ | B64D 11/0606 244/118.6 |
| 9,527,592 B2 * | 12/2016 | Ducreux | ............ | B64D 11/0604 |
| 9,550,573 B2 * | 1/2017 | Ersan | ................ | B64D 11/0606 |
| 10,144,513 B2 * | 12/2018 | Foucher | ............ | B64D 11/0606 |
| 10,773,804 B2 * | 9/2020 | Valdes De La Garza | | ................... B64D 11/0601 |
| 11,365,010 B2 * | 6/2022 | Mansouri | ........... | B64D 11/0648 |

(Continued)

FOREIGN PATENT DOCUMENTS

| | | | | |
|---|---|---|---|---|
| CA | 3041948 A1 * | 5/2018 | ......... | B64D 11/0601 |
| GB | 2362095 A | 11/2001 | | |
| GB | 2500258 A * | 9/2013 | ............... | B60N 2/01 |

OTHER PUBLICATIONS

"International Search Report and Written Opinion for Application No. PCT/EP2018/057549", dated May 25, 2018, 11 Pages.

*Primary Examiner* — Benjamin P Lee
(74) *Attorney, Agent, or Firm* — Jordan IP Law, LLC

(57) ABSTRACT

A passenger seating arrangement for a vehicle cabin comprising a plurality of seat units, wherein the seat units in one column are arranged one behind another in a longitudinal direction of the vehicle cabin, wherein at least one of the forward facing seat units is arranged in a front row section of the vehicle cabin and is followed by at least one angled seat unit in the same column. Further, a vehicle cabin having such a passenger seating arrangement is provided.

18 Claims, 9 Drawing Sheets

(56) References Cited

U.S. PATENT DOCUMENTS

| | | | |
|---|---|---|---|
| 11,679,880 B2* | 6/2023 | Lee | B64D 11/0606 244/118.6 |
| 11,679,881 B2* | 6/2023 | White | B64D 11/0605 244/118.6 |
| 2007/0241232 A1* | 10/2007 | Thompson | B64D 11/04 244/118.6 |
| 2010/0038484 A1* | 2/2010 | Ersan | B64D 11/06 244/118.6 |
| 2010/0038485 A1* | 2/2010 | Harcup | B64D 11/0601 244/118.6 |
| 2012/0223186 A1* | 9/2012 | Henshaw | B64D 11/00151 244/118.6 |
| 2013/0032668 A1* | 2/2013 | Foucher | B60N 2/01 244/118.6 |
| 2013/0106156 A1* | 5/2013 | Orson | B64D 11/0643 297/217.3 |
| 2013/0334368 A1* | 12/2013 | Sankrithi | B64C 1/20 29/401.1 |
| 2014/0283296 A1* | 9/2014 | Jerome | B64D 11/0604 5/12.1 |
| 2014/0306500 A1* | 10/2014 | Dryburgh | B64D 11/0601 297/232 |
| 2015/0166184 A1* | 6/2015 | Dryburgh | B64D 11/0604 244/118.6 |
| 2017/0129611 A1 | 5/2017 | Morgan | |
| 2017/0259921 A1 | 9/2017 | Valdes De La Garza et al. | |
| 2021/0188442 A1* | 6/2021 | Lee | B64D 11/06 |
| 2022/0041284 A1* | 2/2022 | Glain | B64D 11/0601 |
| 2022/0212803 A1* | 7/2022 | James | B64D 11/0601 |
| 2022/0332420 A1* | 10/2022 | Miedema | B64D 11/0602 |
| 2023/0002056 A1* | 1/2023 | Rousse | B64D 11/0015 |
| 2023/0182903 A1* | 6/2023 | Manson | B64D 11/0601 244/118.6 |

* cited by examiner

PASSENGER SEATING ARRANGEMENT

This nonprovisional application is a continuation of International Application No. PCT/EP2018/057549, which was filed on Mar. 23, 2018, and which is herein incorporated by reference.

BACKGROUND OF THE INVENTION

Field of the Invention

The present invention relates to a passenger seating arrangement for a vehicle cabin, in particular for an aircraft cabin.

Description of the Background Art

There are a wide variety of passenger seating arrangements for a vehicle cabin, in particular for an aircraft cabin known in the prior art.

For example, the European Patent EP 2 900 555 B1, which corresponds to U.S. Pat. No. 8,998,139, defines an aircraft cabin and a seating assembly for use in the aircraft cabin. The seating arrangement comprises a multiplicity of substantially identical pairs of seat units; the pairs of seat units are located directly behind one another, wherein the pairs of seat units comprises an aisle-seat unit bordering an aisle to one side and a non-aisle-seat unit positioned to the other side of the aisle-seat unit.

The JP Application H11-152094 defines a plurality of seat modules arranged in an aircraft passenger cabin. The seat module has a partition wall placed at a rear portion of a seat to separate it from the other seat modules. All the seats have the same orientation within each seat module.

SUMMARY OF THE INVENTION

It is therefore an object of the present invention to provide a passenger seating arrangement for a vehicle cabin, in particular for an aircraft cabin or any other passenger carrying vehicle. In particular, a use of space within the vehicle cabin can be advantageously optimised.

The disclosure provides a passenger seating arrangement for a vehicle cabin, in particular an aircraft cabin, comprising a plurality of seat units. The seat units in one column are arranged one behind another in a longitudinal direction of the vehicle cabin. Each seat unit comprises a side bordering an aisle of the vehicle cabin and comprises at least one console and one seat arranged adjacent to the console. In particular, the console is arranged at least partially and substantially alongside of the seat. The seat is adjustable between at least a seating position and at least a bed position. Moreover, each seat unit is one of a forward facing seat unit, wherein at least a longitudinal axis of the seat is parallel to a longitudinal axis of the vehicle cabin, and an angled seat unit, wherein at least the longitudinal axis of the seat is angled relative to the longitudinal axis of the vehicle cabin.

Particularly, a number of forward facing seat units and a number of angled seat units can be arranged in such a manner that at least a density of passenger seats within the vehicle cabin, hereafter termed as cabin, can be optimised whilst ensuring a high comfort space to each passenger.

According to the adjustable seat of the present invention, the seat is formed by at least a seat pan and a backrest. Additionally, the seat may comprise optionally a leg-rest. For instance, the seat can be brought into one or more positions, e.g. into a taxi, take-off, landing position, designated as "TTL" or "TT&L"-position, an inclined position or a sleeping position. Particularly, in the sleeping position the seat pan, the backrest and optionally the leg-rest are brought into a substantially flat, horizontal position.

According to an embodiment of the passenger seating arrangement, each of the seat units comprises a furniture structure having at least a partition wall to separate the seat units from each other. In particular, the partition wall is a wall arranged behind each seat of the seat units and separates them from each other in the longitudinal direction of the cabin. Furthermore, the side of the seat unit which is bordering the aisle can be part of the furniture structure. This side provides privacy to a passenger seated in a corresponding seat unit from other seat units positioned opposite the aisle. The console can also be part of the furniture structure. Furthermore, the furniture structure can comprise at least one movable or immovable armrest arranged next to the seat. Thereby, the movable armrest can provide a sleeping surface extension in a stowed position. In particular, an enclosed suite can be provided to each of the seat units by the furniture structure.

In an embodiment of the passenger seating arrangement, the console of each seat unit comprises at least a footwell for a passenger seated behind and a utility surface for a corresponding passenger of the seat unit. In particular, the console comprises an open space at a rear side facing towards the passenger seated behind, such that the footwell is accessible for a rear passenger. For instance, the adjustable seat can be brought into the sleeping position, in particular a bed position, such that the seat is partially projecting into the footwell. Therefore, the console and a footwell space can be seen as an extension space for the rear passenger. Further, the console can comprise a support surface portion which is fixed inside the footwell space. When the seat is brought into the sleeping position, the leg-rest comes into contact with the support surface portion of the footwell such that a sleeping surface is extended for the rear passenger. The support surface portion has a corresponding shape with a shape of the leg-rest. The utility surface for the corresponding passenger of the seat unit is provided by an upper surface of the console. For example, the utility surface can comprise a shelf, a table, storage space and storage area. The storage area can provide storage space for a remote control, magazines, suitcases, shoes, headphones or other items belonging to the passenger or airline. Additionally, the utility surface can comprise service and operational elements, such as switches and HMI-panel to control operable features of the seat unit.

In an embodiment of the passenger seating arrangement, at least one of the forward facing seat units is arranged in a front row section of the vehicle cabin and is followed by at least one angled seat unit in the same column. For example, the cabin or the columns can be subdivided into three sections. The sections comprise one of a front row section, a center row section and a rear row section. Thereby, the front row section can comprise three seat units arranged behind each other in the longitudinal direction of the cabin. The center row section can comprise three seat units and the rear row section can comprise three seat units arranged behind each other in the longitudinal direction of the cabin. Depending on an interior space of the vehicle cabin, a number of seat units of each section can be varied. Further, the number of seat units and also the division into sections can varied as desired by e.g. an airline itself. The term "interior space" is understood as comprising dimensions of the vehicle cabin, in particular a length and a width of at least a passenger carrying compartment of the vehicle. The length of the passenger carrying compartment affects a length of each column, in particular the number of seat units arranged behind each other within each column. The width of the passenger carrying compartment affects a number of columns arranged next to each other in a transverse direction of the vehicle cabin. For instance, the cabin can comprise one or more outer columns along each vehicle cabin wall and one or more center columns arranged between the outer columns. Thereby, the center columns can be separated from the outer columns and/or from each other by aisles.

Moreover, the present invention relates to a seating passenger arrangement, wherein several forward facing seat units are arranged behind each other at least in the front row section.

Depending on monumental structures, interior structures, such as interior trims or interior fittings within the vehicle cabin, in particular in a front and rear of the cabin, it is desirable to position the seat units such that the passenger seating arrangement is optimised. For this purpose, the forward facing seat unit can be arranged in the front and/or the rear of the cabin to take up less width. The interior structures can comprise a galley, lavatories, doors, emergency exit, staff storage, staff seats, electronic compartments etc. around which the seat units must be arranged. Angled seat units can be arranged in the center section of the cabin, where a width/length trade-off allows a space-efficient arrangement. Further, a space in a front of the cabin can be maximised, e.g. for interior structures of the vehicle.

According to an embodiment of the passenger seating arrangement, the seat and the console of each forward facing seat unit are arranged in a staggered manner when several forward facing seat units are arranged behind each other. This allows same seat unit features provided to each passenger, in particular a usage of the console comprising the footwell for each rear passenger and the utility surface for each corresponding passenger.

In an embodiment of passenger seating arrangement, the seat of the seat units can comprise a narrow portion and a wide portion. Thereby, the narrow portion can be formed by the leg-rest. The wide portion can be formed by one of the seat pan or the backrest. In the staggered arrangement of the seat units, the stagger is such that in the bed position the narrow portion of one seat unit is adjacent the wide portion of another seat unit. An overall width of the two columns can therefore be reduced by tessellating these narrow and wide portions.

In an embodiment of the passenger seating arrangement, several angled seat units are identically arranged behind each other, wherein the seats of the angled seat units are identically angled. This ensures alignment of each front footwell with each rear seat of the angled seat units.

In accordance with an embodiment of the passenger seating arrangement, the angled seat units comprise two different configurations, an outwardly angled seat configuration and an inwardly angled seat configuration. Each of the mentioned configurations depends on an orientation of the seat with respect to the aisle. Particularly, each of the configurations comprise the seat positioned at an angle of about 30° to 50°, preferably 45°, with respect to the aisle. Specifically, the inwardly angled seat can be positioned within the angled seat unit at an angle of about 30° to 50°, preferably 45°, facing towards the aisle. The outwardly angled seat can be positioned within the angled seat unit at an angle of about 30° to 50°, preferably 45°, facing away from the aisle. It is understood that the seat which is angled relative to the longitudinal axis of the vehicle cabin is substantially facing a forward direction of the vehicle cabin.

Nevertheless, it is possible to arrange all the seat units facing a rearward direction of the vehicle cabin. In addition, by arranging several identically angled seat units behind each other in the same column a so-called herringbone passenger seating arrangement or herringbone seating configuration can be achieved.

An embodiment of the passenger seating arrangement provides a number of forward facing seat units and a number of angled seat units arranged in an alternating manner in the same column. Exemplarily, at least one of the outer columns or center columns can comprise one or more forward facing seat units in the front row section. This forward facing seat unit can be followed by several angled seat units, particularly arranged within the center section of the cabin. Thereafter, several forward facing seat units can be arranged in the rear section of the cabin following the angled seat units of the center section.

The configuration of each angled seat unit can alternate when the forward facing seat units and the angled seat units are arranged in alternately manner in the same column. In particular, the seat of the forward facing seat unit and the seat of the angled seat unit are arranged behind each other on the same side with respect to the aisle. In particular, the configuration of the angled seat unit depends on an orientation of the console of its front forward facing seat unit. By the term "orientation of the console" an arrangement of the console, particularly on which side of the seat, with respect to the aisle or the cabin wall will be understood.

For instance, the seat units within the same column are facing in a flight direction, wherein a first forward facing seat unit is followed by a second angled seat unit. A third forward facing seat unit is arranged behind the second angled seat unit. The third forward facing seat unit is followed by a fourth angled seat unit. When the first forward facing seat unit comprises the console arranged adjacent to the cabin wall and the seat arranged adjacent to the aisle, the second angled seat unit must comprise an outwardly angled seat configuration. Thereby, the console of the first forward facing seat unit can provide the foot well to the second angled seat unit. In particular, the console of the first forward facing seat unit and the seat of the second angled seat unit are substantially diagonally aligned. That means, the seat of second angled seat unit is arranged on the same side as the seat of the first forward facing seat unit. The seat of the third forward facing seat unit is arranged on the other side than the seat of the second angled seat unit. That means, the seat of the third forward facing seat unit is arranged on the same side as the console of the second angled seat unit. Thereby, the console of the second angled seat unit can provide the footwell to the third forward facing seat unit. Thus, the fourth angled seat unit must comprise an inwardly angled seat configuration.

In an embodiment, the passenger seating arrangement of the present invention can provide a combination of different seat unit types whilst providing same comfort and spaciousness for the passengers. Therefore, the passenger can choose between a wide variety of possibly desired orientations of the seat. Particularly, the passenger can choose between one of a forward facing seat and an angled seat unit, such as comprising an inwardly angled seat configuration or an outwardly angled seat configuration. Thereby, same seat unit features can be provided to each passenger, in particular a usage of the console comprising the footwell for each rear passenger and the utility surface for each corresponding passenger.

The seat units can be distanced from each other by a pitch providing a passenger access. Each seat unit is separately accessible by a corresponding aisle.

Additionally or optionally, a further embodiment relates to a passenger seating arrangement, wherein a width of the passenger access between two seat units is expanding in a direction towards the aisle. For example, the passenger access is provided between a rear surface of the partition wall of the seat unit and a front surface of the console arranged behind the partition wall. At least the front surface of the console can be horizontally curved-shaped or bent-shaped in such a manner that the front surface and the rear surface diverge in the direction towards the aisle.

The disclosure further relates to a vehicle cabin comprising a passenger seating arrangement as described above and hereafter.

According to an exemplary embodiment of the vehicle cabin, at least two columns and at least one aisle between the columns are provided within. Each of the columns can provide a different number of seat units arranged behind each other. Further, each of the columns can provide a different number of seat unit types. For example, the vehicle cabin and so the columns can be subdivided into three main sections. The main sections comprise one of a front row section, a center row section and a rear row section. Thereby, the front row section of each column can comprise one or more seat units arranged behind each other. The center row section of each column can comprise one or more seat units and the rear row section of each column can comprise one or more seat units arranged behind each other in the longitudinal direction of the cabin.

According to an embodiment of the vehicle cabin, at least two center columns and two outer columns are provided within. In particular, each of the center columns comprises a number of angled seat units with inwardly angled seat configurations providing a direct passenger access to each seat unit from the aisle. Further, each of the outer columns comprises a number of angled seat units with inwardly or outwardly angled seat configurations. An advantage of inwardly angled seat configurations in the outer columns is to provide a direct passenger access to the seat. An advantage of outwardly angled seat configurations in the outer columns is to provide a view towards a window for each passenger.

In an embodiment of the vehicle cabin, the two center columns can comprise a number of outwardly angled seat units providing a high privacy feeling to a passenger facing away from the aisle.

In particular, a front row section of one or more columns within the cabin can comprise a number of forward facing seat units. Exemplary, the front row section is provided in a cabin portion which is narrowing towards a cockpit or a vehicle tail.

In an embodiment of the vehicle cabin, the outer columns can comprise only outwardly or inwardly angled seat configurations. The center columns can comprise a combination of forward facing seat units and angled seat units. Further, another possible passenger seating arrangement can comprise outer columns with the combination of forward facing seat units, whereas the center columns can comprise only forward facing seat units, inwardly angled seat units or outwardly angled seat units. Each of the columns can be individually modified.

Further, it is to be mentioned that each of the columns arranged within the vehicle cabin can provide a different arrangement of seat units, whereas according to the present invention a combination of a forward facing seat unit and an angled seat unit within the same column is ensured.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION

Figure 1:
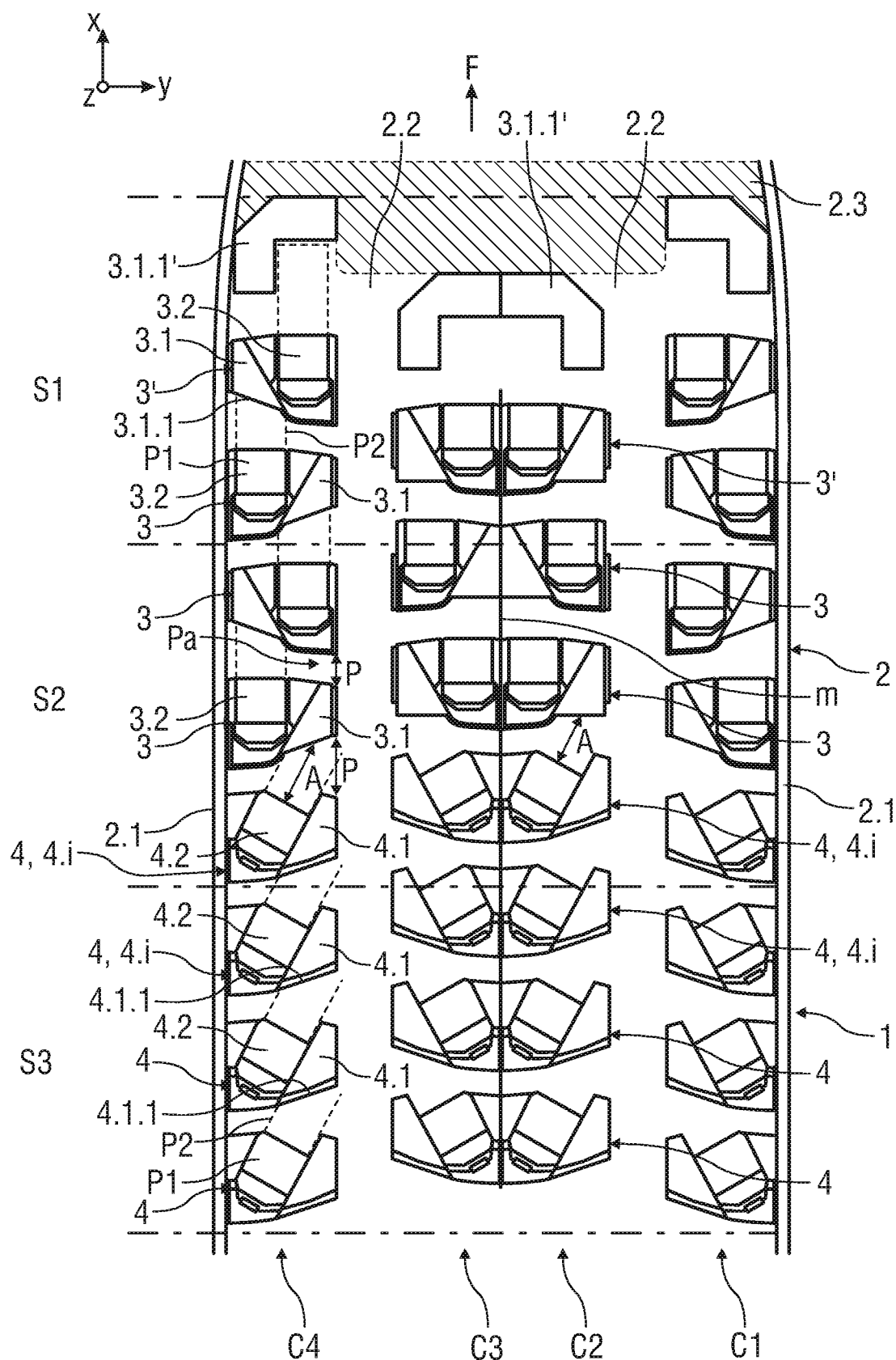
FIG. 1 is a top view of an embodiment of a passenger seating arrangement for a vehicle cabin, in particular for an aircraft cabin.

FIG. 1 shows a top view of an embodiment of a passenger seating arrangement 1 for a vehicle cabin 2. The vehicle cabin 2 is for example an aircraft cabin, a train cabin or any other passenger carrying vehicle cabin.

For a better understanding of subsequent descriptions of the passenger seating arrangement 1 a coordinate system is shown in further figures. The coordinate system comprises a longitudinal axis x, a transverse axis y and a vertical axis z in relation to the aircraft. In particular, the longitudinal axis x defines a longitudinal direction and length of the vehicle cabin 2, the transverse axis y defines a transverse direction and width of the vehicle cabin 2 and the vertical axis z defines a vertical direction and height of the vehicle cabin 2. Exemplarily, a flight direction F is shown in further figures.

The vehicle cabin 2 comprises four columns C1 to C4. Each column C1 to C4 comprises a plurality of seat units 3, 4. The seat units 3, 4 are arranged one behind another in the longitudinal direction of the vehicle cabin 2, hereafter termed as cabin 2.

In particular, each of the columns C1 to C4 comprises a number of forward facing seat units 3. Further, each of the columns C1 to C4 comprises a number of angled seat units 4. All the seat units 3, 4 can be arranged behind each other within the same column C1 to C4.

Depending on an interior space of the cabin 2, the number of seat units 3, 4 of each column C1 to C4 can vary. Moreover, the number of columns C1 to C4 can vary. The term "interior space" is understood as comprising dimensions of the cabin 2, in particular the length and the width of the cabin 2. Particularly, the cabin 2 is a passenger carrying compartment of the not further detailed shown vehicle. The length affects a length of each column C1 to C4, in particular the number of seat units 3, 4. The width affects the number of columns C1 to C4 arranged next to each other in the transverse direction of the cabin 2. For instance, the cabin 2 can comprise one or more outer columns C1, C4 along each vehicle cabin wall 2.1. Further, one or more center columns C2, C3 can be arranged between the outer columns C1, C4. Thereby, the center columns C2, C3 are separated from the outer columns C1, C4 by aisles 2.2.

The center columns C2, C3 are aligned with each other in the longitudinal direction of the cabin 2. In the shown embodiment, the center columns C2, C3 are aligned along a center axis m of the cabin 2.

In another embodiment, the center column C2 can be separated from the center column C3 by an additional aisle 2.2.

A pitch P is provided between each of the seat units 3, 4. The pitch P defines a passenger access Pa. Each of the seat units 3, 4 is separately accessible by the aisle 2.2. In particular, the seat units 3, 4 of the outer columns C1, C4 are positioned offset to the seat units 3, 4 of the center columns C2, C3. This offset arrangement prevents directly opposite aligned pitches P such that a personal privacy of the passengers is ensured.

Each of the forward facing seat units 3 and the angled seat units 4 comprise a side bordering the aisle 2.2. Also, each of the seat units 3, 4 comprises a console 3.1, 4.1 and a seat 3.2, 4.2. The seat 3.2, 4.2 is arranged adjacent to the console 3.1, 4.1. Each of the seats 3.2, 4.2 is adjustable between at least a seating position P1 and at least a bed position P2. In the bed position P2 the seat 3.2, 4.2 is brought into a substantially flat, horizontal position.

Further, the console 3.1, 4.1 of each seat unit 3, 4 comprises a footwell 3.1.1, 4.1.1 for a passenger seated behind. In particular, the console 3.1, 4.1 comprises an open space at a rear side facing towards the passenger seated behind, such that the footwell 3.1.1, 4.1.1 is accessible for a rear passenger. For instance, the adjustable seat 3.2, 4.2 can be brought into the sleeping position P2, such that the seat 3.2, 4.2 is at least partially projecting into the footwell 3.1.1, 4.1.1.

Particularly, each forward facing seat unit 3 comprises the seat 3.2, wherein a longitudinal axis of the seat 3.2 is parallel to the longitudinal axis x of the cabin 2. Each angled seat unit 4 comprises the seat 4.2, wherein a longitudinal axis of the seat 4.2 is angled relative to the longitudinal axis x of the cabin 2.

In the shown embodiment, the angled seat units 4 of each column C1 to C4 comprise an inwardly angled seat configuration 4.*i* depending on an orientation of the seat 4.2 with respect to the aisle 2.2. Thereby, within the angled seat unit 4 the seat 4.2 can be positioned at an angle of about 30° to 50°, preferably 45°, facing towards the aisle 2.2.

Exemplary, the columns C1 to C4 can be subdivided into three sections S1 to S3. The sections S1 to S3 comprise one of a front row section S1, a center row section S2 and a rear row section S3.

In particular, a number of the forward facing seat units 3 is arranged in the front row section S1 and is followed by a number of angled seat units 4 in the same column C1 to C4.

It will be understood that one of the angled seat units 4 can be also followed by at least one of the forward facing seat units 3 within one of the columns C1 to C4.

Referring to the shown embodiment, the outer columns C1, C4 comprise two forward facing seat units 3 within the front row section S1. Two forward facing seat units 3 are arranged in the center row section S2 followed by one angled seat unit 4. Thereby, when several forward facing seat units 3 are arranged behind each other, the seat 3.2 and the console 3.1 of each forward facing seat unit 3 are arranged in a staggered manner. A position of the console 3.1 and a position of the seat 3.2 alternate. The rear row section S3 comprises three angled seat units 4.

The center columns C2, C3 comprise one forward facing seat unit 3 within the front row section S1 and two forward facing seat units 3 within the center row section S2 followed by one angled seat unit 4. Further, three angled seat units 4 are arranged in the rear row section S3. Particularly, the angled seat units 4 arranged behind each other within the same column C1 to C4 comprise identically inwardly angled seat configurations 4.*i*.

Having a detailed view on the center row section S2, the configuration of the angled seat unit 4 arranged directly behind one of the forward facing seat units 3 depends on an orientation of the console 3.1 of the forward facing seat unit 3 in front. Thereby, the seat 3.2 of each of the forward facing seat units 3 is either aligned with the center axis m of the cabin 2 or with the cabin wall 2.1. That means that the console 3.1 of the forward facing seat unit 3 is arranged bordering the aisle 2.2. Additionally, the console 4.1 of the angled seat unit 4 arranged directly behind the forward facing seat unit 3 is bordering the aisle 2.2 as well. Thereby, the seat 3.2 of the forward facing seat unit 3 and the seat 4.2 of the angled seat unit 4 are arranged behind each other on the same side with respect to the aisle 2.2. To ensure alignment A between the footwell 3.1.1 of the front forward facing seat unit 3 and the seat 4.2 of the rear angled seat unit 4, the seat 4.2 has to be inwardly facing towards the aisle 2.2. In particular, the seat 4.2 is angled such that the seat 4.2 is facing towards the footwell 3.1.1.

Depending on not detailed shown structures 2.3 of the cabin 2, e.g. monumental structures or interior structures, such as interior trims or interior fittings within the cabin 2, it is desirable to position the seat units 3, 4 such that the passenger seating arrangement 1 is optimised. For instance, those structures 2.3 can be fixed in the front row section S1 or the rear row section S3 within the cabin 2. For this purpose, the forward facing seat unit 3 can be arranged in the front row section S1 or the rear of the cabin 2 to take up less width. Those structures 2.3 can comprise e.g. a galley, lavatories, doors, emergency exit, staff storage, staff seats, electronic compartments etc. around which the seat units 3, 4 must be arranged. The angled seat units 4 can be arranged in the center section S2 of the cabin 2, where a width/length trade-off allows a space-efficient arrangement.

Particularly, the cabin 2 can narrow towards a front of the vehicle, such that arranging the forward facing seat units 3 in a narrowed area of the cabin 2 tends to efficiently use a limited width of the cabin 2. The footwell 3.1.1' for a very first front row forward facing seat unit 3' can be shaped such that no corner is impinging too far into the aisle 2.2. In particular, the footwell 3.1.1' for the very first front row forward facing seat unit 3' is formed within a separate component arranged within the front row section S1. This component can comprise further storage area for the passenger of the very first front row. For example, the component can comprise one of a privacy wall and a movable privacy door, whereas the privacy wall can be adapted to comprise lateral movable storage, such as a wardrobe, shoe boxes or the like. Thereby, the lateral movable storage can be driven out of the privacy wall, for example substantially aligned with the movable privacy door, when the privacy door is in a stowed position.

In a further embodiment, the very first front row forward facing seat unit 3' can provide a larger comfort space to the passenger. Moreover, the very first front rows of the center columns C2, C3 can provide a double-bed feature, whereas one or more divider between the two seat units 3' can be stowed such that the seats 3.2' of each of the seat units 3' form a double-bed surface. Exemplarily, above the footwell 3.1.1' of the very first front row, a comparatively lager monitor can be arranged. Therefore, the very first front row of each of the columns C1 to C4 can be configured as one of a more comfortable, luxurious seat unit 3.1'.

Figure 2:
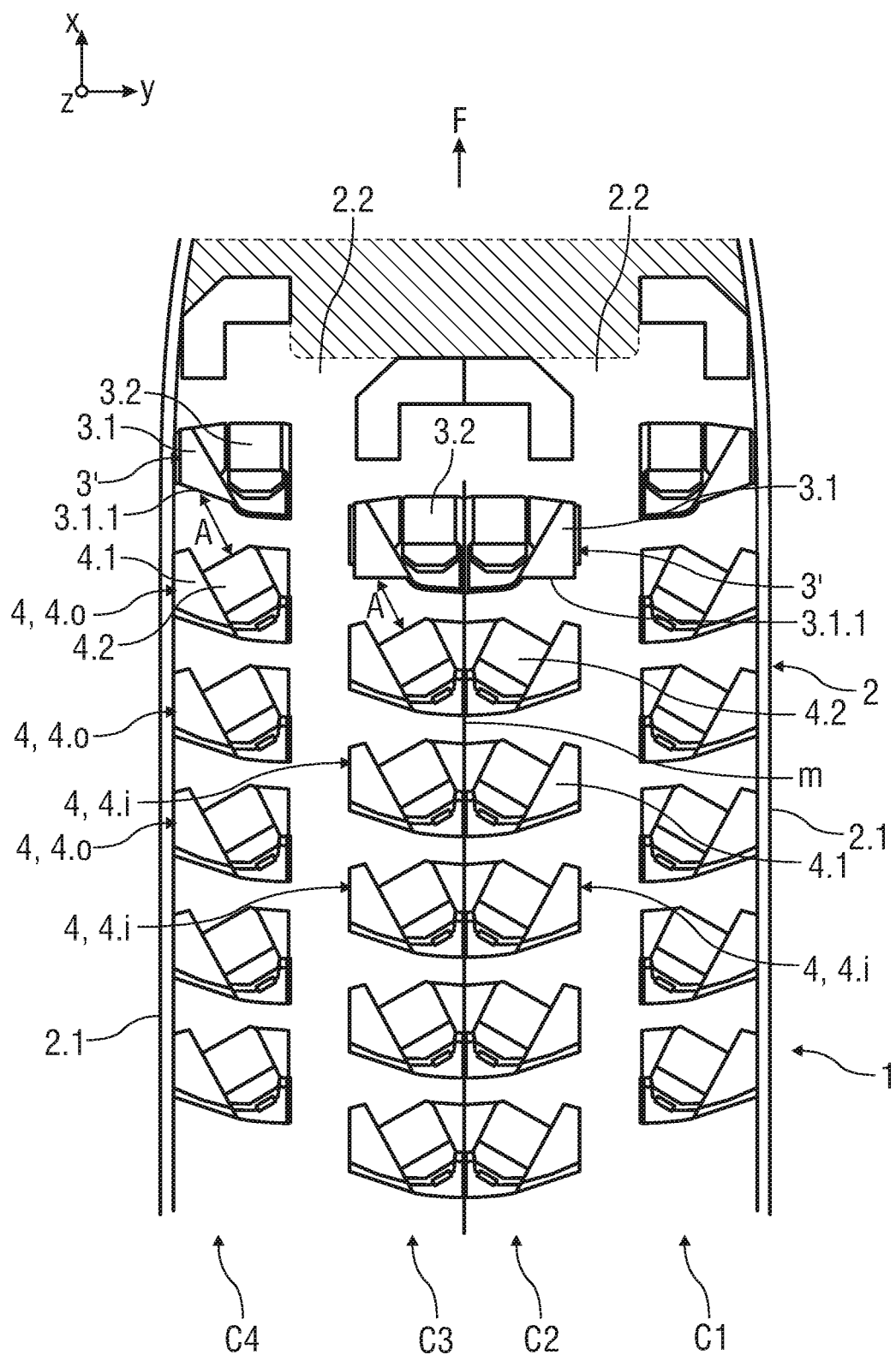
FIG. 2 is a top view of another embodiment of the passenger seating arrangement.

FIG. 2 shows a top view of another embodiment of the passenger seating arrangement 1.

The vehicle cabin 2 comprises four columns C1 to C4. Each column C1 to C4 comprises a plurality of seat units 3, 4. The seat units 3, 4 are arranged one behind another in the longitudinal direction of the vehicle cabin 2.

Each of the columns C1 to C4 comprises a very first front row forward facing seat unit 3' which is followed by several angled seat units 4.

In particular, each of the center columns C2, C3 comprises several angled seat units 4 having an inwardly angled seat configuration 4.*i*. Thereby, all seats 3.2, 4.2 of the seat units 3, 4 of the center columns C2, C3 are aligned with the center axis m of the cabin 2. All the consoles 3.1, 4.1 of the seat units 3, 4 of the center columns C2, C3 are arranged bordering the aisle 2.2.

Each of the outer columns C1, C4 comprises several angled seat units 4 having an outwardly angled seat configuration 4.*o*. Thereby, within the angled seat unit 4 the seat 4.2 can be positioned at an angle of about 30° to 50°, preferably 45°, facing away from the aisle 2.2. Particularly, the angled seat units 4 arranged behind each other within the same outer column C1, C4 comprise identically outwardly angled seat configurations 4.*o*.

The seats 3.2, 4.2 of the seat units 3, 4 of the outer columns C1, C4 are all arranged bordering the aisle 2.2, wherein the consoles 3.1, 4.1 are all arranged adjacent the cabin wall 2.1.

Figure 3:
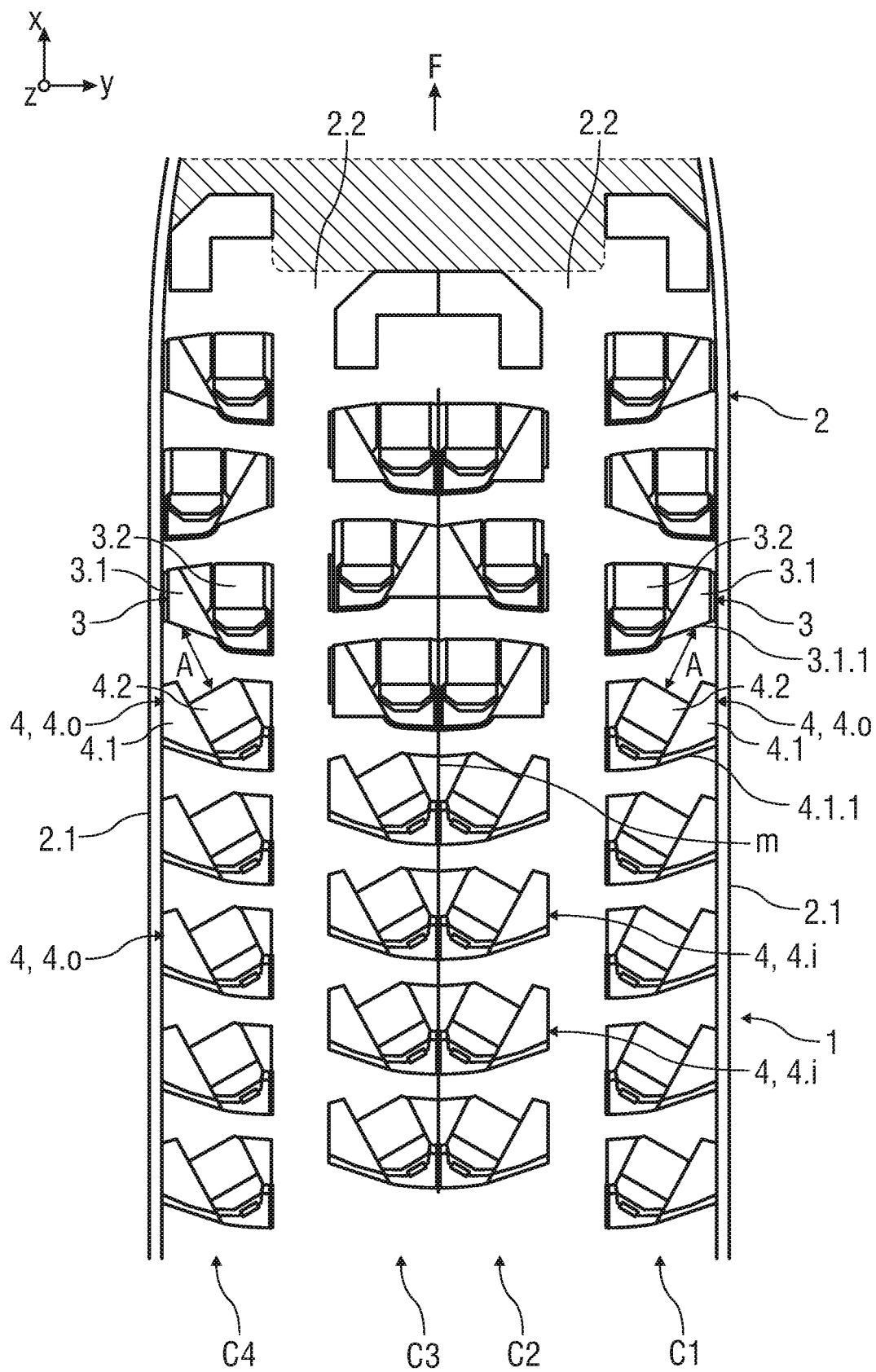
FIG. 3 is a top view of a further embodiment of the passenger seating arrangement.

FIG. 3 shows a top view of a further embodiment of the passenger seating arrangement 1.

The vehicle cabin 2 comprises four columns C1 to C4. Each column C1 to C4 comprises a plurality of seat units 3, 4. The seat units 3, 4 are arranged one behind another in the longitudinal direction of the vehicle cabin 2.

In particular, each of the columns C1 to C4 comprises a number of forward facing seat units 3. Further, each of the columns C1 to C4 comprises a number of angled seat units 4.

Each of the center columns C2, C3 comprises three forward facing seat units 3 arranged one behind the other and which are followed by four angled seat units 4. In particular, each of the angled seat units 4 within one of the center columns C2, C3 comprise identically inwardly angled seat configurations 4.*i*.

Each of the outer columns C1, C4 comprises three forward facing seat units 3 followed by five angled seat units 4. The angled seat units 4 of each outer column C1, C4 comprise outwardly angled seat configurations 4.*o*.

Figure 4:
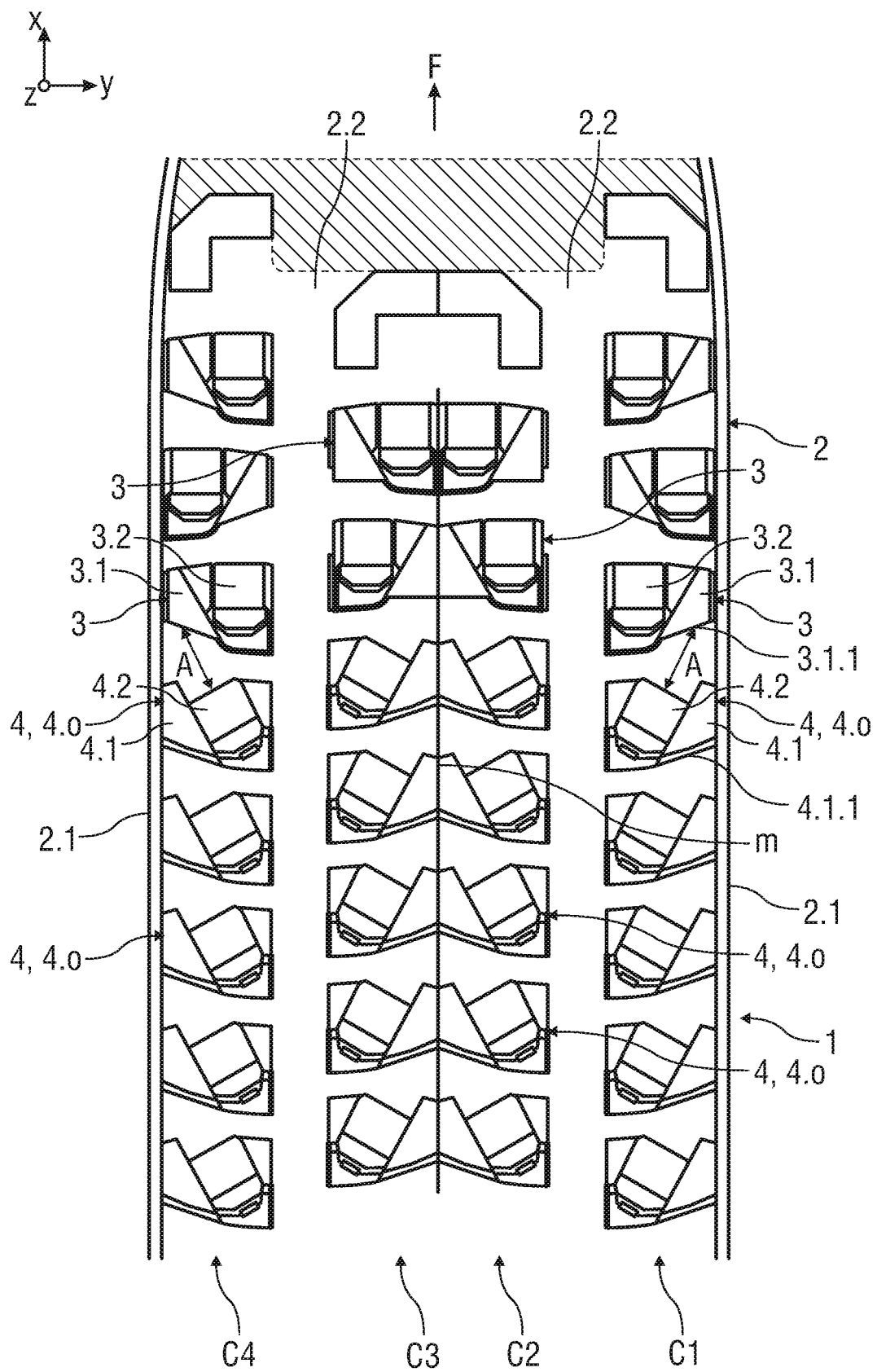
FIG. 4 is a top view of a further possible embodiment of the passenger seating arrangement.

FIG. 4 shows a further possible embodiment of the passenger seating arrangement 1.

The vehicle cabin 2 comprises four columns C1 to C4. Each column C1 to C4 comprises a plurality of seat units 3, 4. The seat units 3, 4 are arranged one behind another in the longitudinal direction of the vehicle cabin 2.

In particular, each of the columns C1 to C4 comprises a number of forward facing seat units 3. Further, each of the columns C1 to C4 comprises a number of angled seat units 4.

Each of the outer columns C1, C4 comprises three forward facing seat units 3 arranged one behind the other and which are followed by five angled seat units 4. Each of the center columns C2, C3 comprises two forward facing seat units 3 arranged one behind the other and which are followed by five angled seat units 4. The angled seat units 4 are all identically arranged behind each other within the same column C1 to C4.

In the shown embodiment, the angled seat units 4 of each column C1 to C4 comprise outwardly angled seat configurations 4.*o* with respect to the aisle 2.2.

In particular, the angled seat units 4 of the center columns C2, C3 converge towards the center axis m of the cabin 2.

Figure 5:
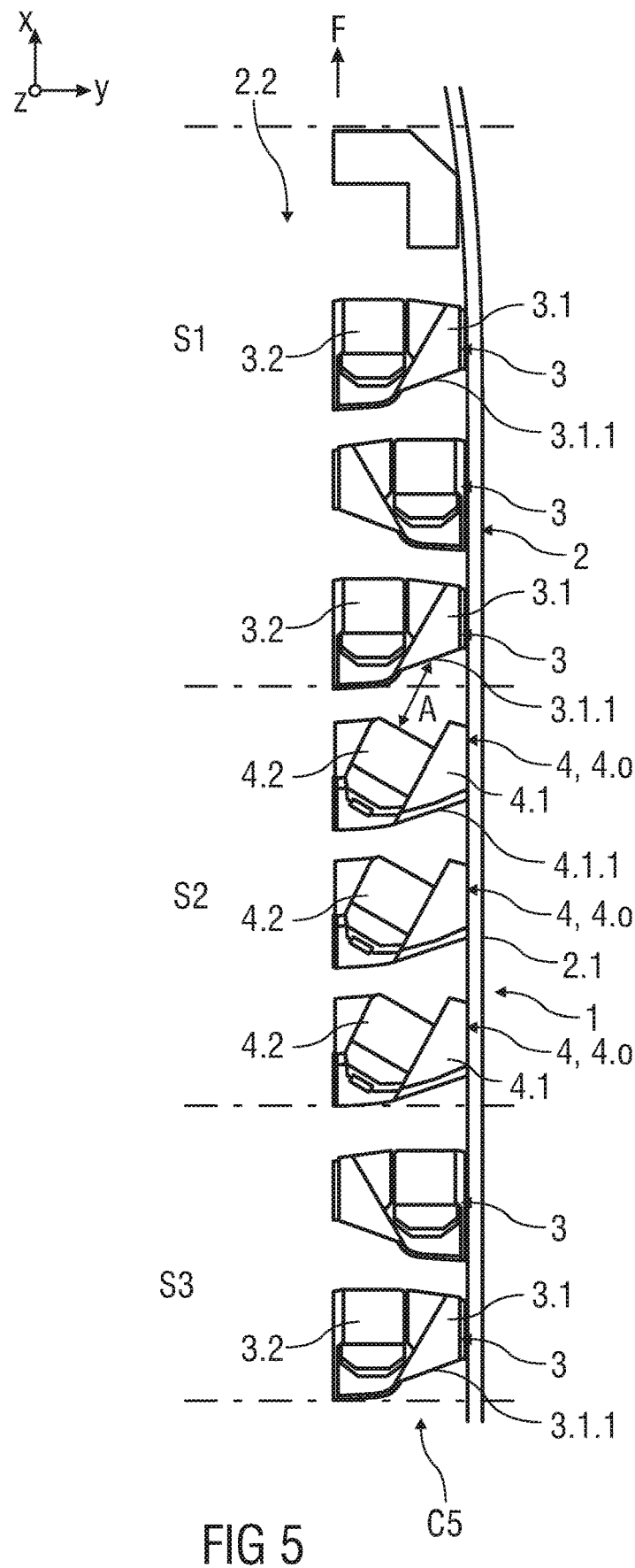
FIG. 5 is a top view of an embodiment of one column of the passenger seating arrangement.

FIG. 5 shows a top view of an embodiment of one column C5 of the passenger seating arrangement 1. In particular, the column C5 can be one of a center column or an outer column.

In the shown embodiment, the column C5 is an outer column C5 which is arranged adjacent the cabin wall 2.1.

In particular, the forward facing seat units 3 and the angled seat units 4 are arranged in an alternating manner in the same column C5. For instance, the column C5 is subdivided into three sections S1 to S3. The sections S1 to S3 comprise one of a front row section S1, a center row section S2 and a rear row section S3. The column 5 comprises in the front row section S1 three forward facing seat units 3 arranged behind another. The forward facing seat units 3 of the front row section S1 are followed by three angled seat units 4. Particularly, the angled seat units 4 are arranged within the center row section S2. Furthermore, the angled seat units 4 are followed by two forward facing seat units 3, particularly arranged within the rear row section S3.

In the shown embodiment, all of the angled seat units 4 comprise outwardly angled seat configurations 4.*o* with respect to the aisle 2.2. This configuration is depending on an orientation of the console 3.1 of the forward facing seat unit 3 arranged directly in front of the angled seat unit 4. Thereby, the console 3.1 of the forward facing seat unit 3 is arranged next to the cabin wall 2.1. To ensure alignment A of the seat 4.2 of the angled seat unit 4 with the footwell 3.1.1 of the front forward facing seat unit 3 the angled seat unit 4 must comprise the outwardly angled seat configuration 4.*o*. In this case, the seat 4.2 is facing towards the footwell 3.1.1 and away from the aisle 2.2.

To arrange the forward facing seat unit 3 in the rear row section S3 directly behind the angled seat unit 4 of the center row section S2, the orientation of the seat 3.2 and the console 3.1 of the forward facing seat unit 3 has to be reversed with respect to the seat 4.2 and the console 4.1 of the angled seat unit 4. In particular, the seat 3.2 is arranged aligned with the footwell 4.1.1 provided by the console 4.1 of the angled seat unit 4.

Figure 6:
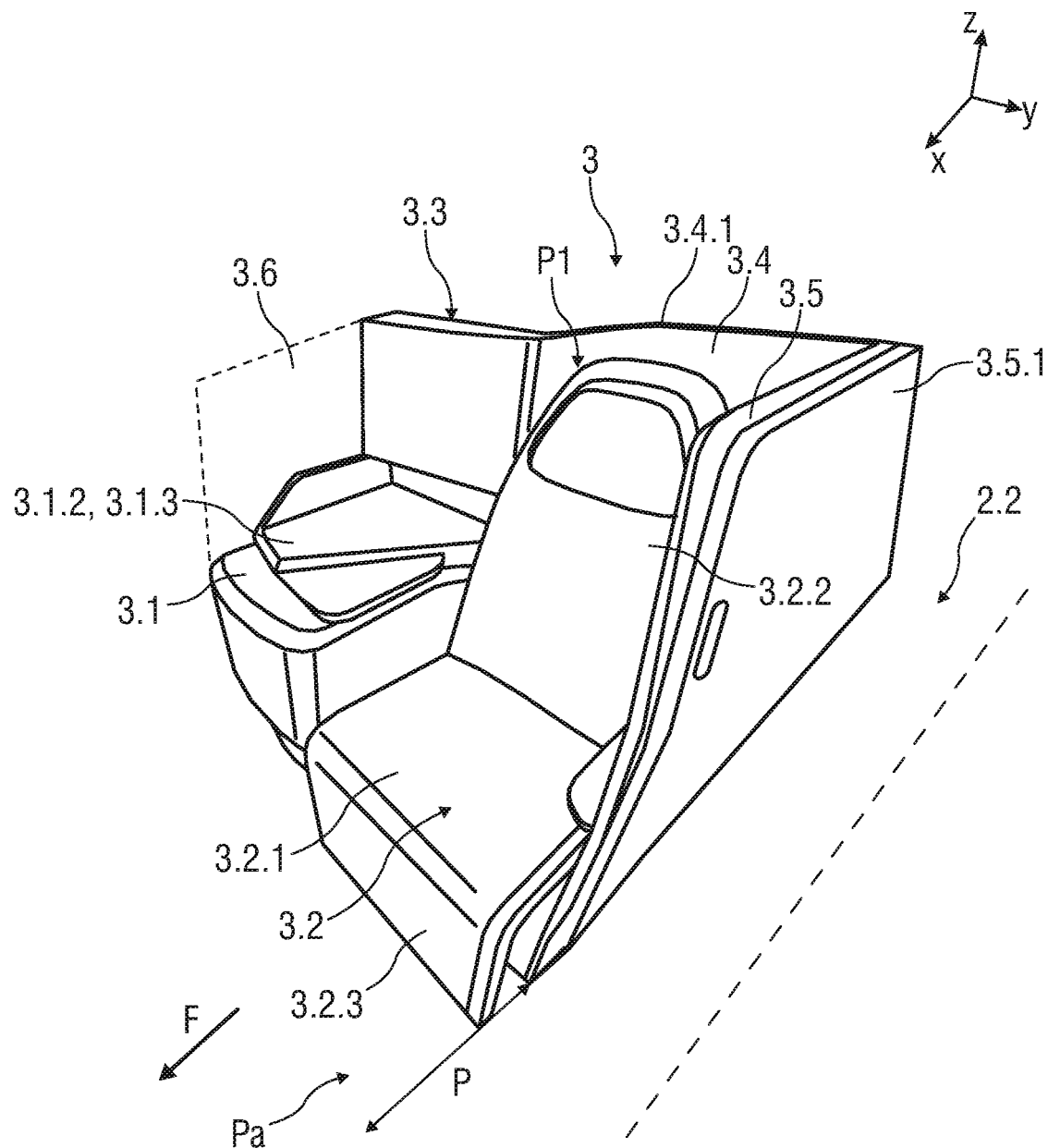
FIG. 6 is a perspective view of an embodiment of a forward facing seat unit of the passenger seating arrangement.

FIG. 6 shows a perspective view of an embodiment of the forward facing seat unit 3 of the passenger seating arrangement 1.

According to the adjustable seat 3.2 of the shown forward facing seat unit 3, the seat 3.2 is formed by a seat pan 3.2.1, a backrest 3.2.2 and a leg-rest 3.2.3. Additionally, the seat 3.2 can comprise a head-rest or a leg-rest extension.

For instance, the seat 3.2 can be brought into one or more positions, e.g. into a taxi, take-off, landing position, designated as "TTL" or "TT&L"-position or the seating position P1, an inclined position or the bed position P2. Particularly, in the bed position P2 the seat pan 3.2.1, the backrest 3.2.2 and the leg-rest 3.2.3 are brought into a substantially flat, horizontal position.

The forward facing seat unit 3 comprises a furniture structure 3.3 having at least a partition wall 3.4 to separate several seat units 3, 4 from each other. In particular, the partition wall 3.4 is a wall arranged behind the seat 3.2 and the console 3.1 and separates them in the longitudinal direction of the cabin 2. On a rear surface 3.4.1 of the partition wall 3.4, which faces towards a rear passenger seated behind, a monitor or screen can be attached. The monitor or screen can at least provide information or entertainment to the rear passenger.

Furthermore, the furniture structure 3.3 comprises a privacy wall 3.5 on the aisle 2.2 bordering side of the seat unit 3. In the shown embodiment, the privacy wall 3.5 is coupled to the partition wall 3.4. The privacy wall 3.5 can comprise a movable privacy door 3.5.1 for at least partially closing the pitch P and the passenger access Pa.

Additionally, the furniture structure 3.3 can comprise a movable or fixed privacy screen 3.6, shown as dotted line. The privacy screen 3.6 is arranged on an opposite side of the privacy wall 3.5.

The console 3.1 of each forward facing seat unit 3 comprises the footwell 3.1.1 for the passenger seated behind. In particular, the console 3.1 comprises an open space at a rear side facing towards the passenger seated behind, such that the footwell 3.1.1 is accessible for the rear passenger. For instance, the adjustable seat 3.2 can be brought into the bed position P2, such that the seat 3.2 is partially projecting into the footwell 3.1.1.

According to an additional embodiment, the console 3.1 can comprise a not further shown support surface portion which is fixed inside the footwell 3.1.1. When the seat 3.2, 4.2 of the rear passenger is brought into the bed position P2, the seat 3.2, 4.2 can come into contact with the support surface portion of the footwell 3.1.1. Particularly, a sleeping surface is extended for the rear passenger. Further, the support surface portion within the footwell 3.1.1 can provide a shape corresponding with the seat 4.2 of the outwardly or inwardly angled seat configuration 4.*o*, 4.*i* or with the seat 3.2 of another forward facing seat unit 3 in the bed position P2.

Further, the console 3.1 comprises a utility surface 3.1.2 for a corresponding passenger of the seat unit 3. The utility surface 3.1.2 for the corresponding passenger is provided by an upper surface 3.1.3 of the console 3.1. For example, the utility surface 3.1.2 can comprise at least one of a shelf, a table-top, storage space and storage area. Additionally, the utility surface 3.1.2 can comprise service and/or operational elements, such as switches and HMI-panel to control operable features of the seat unit 3.

Figure 7A:
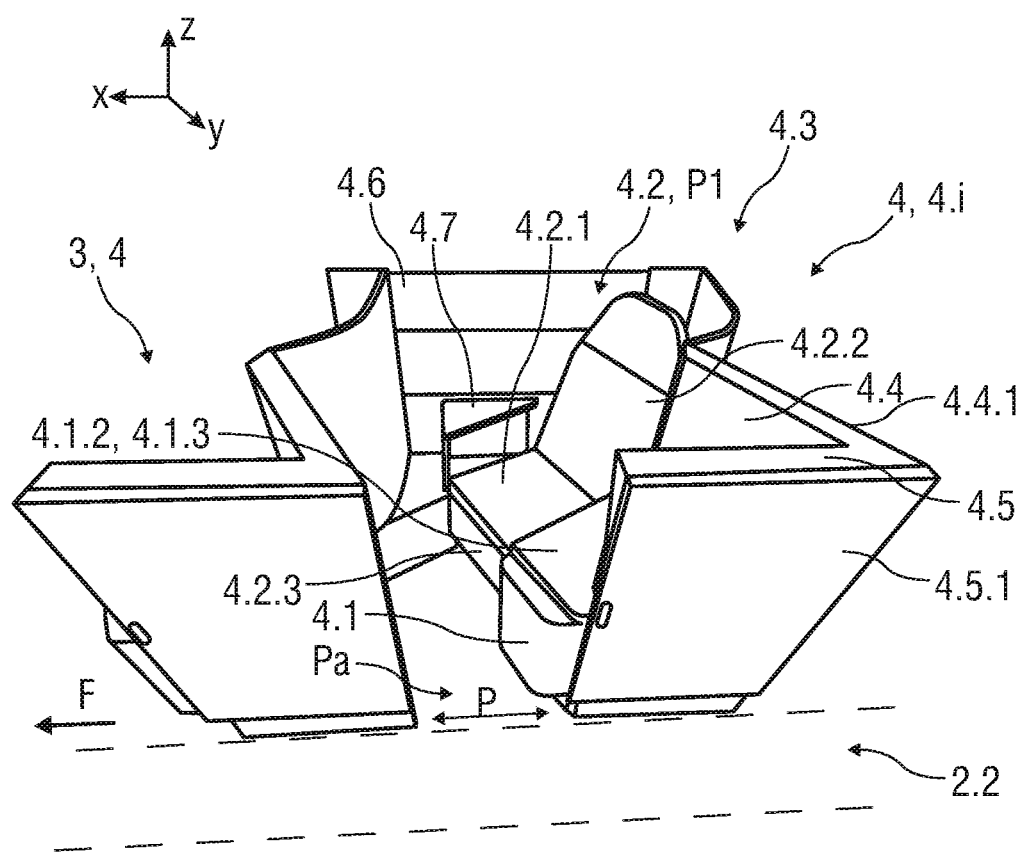
FIG. 7A to 7B are a perspective view of embodiments of angled seat units of the passenger seating arrangement and FIG. 8 is a top view of an embodiment of seat units arranged behind another.
Figure 7B:
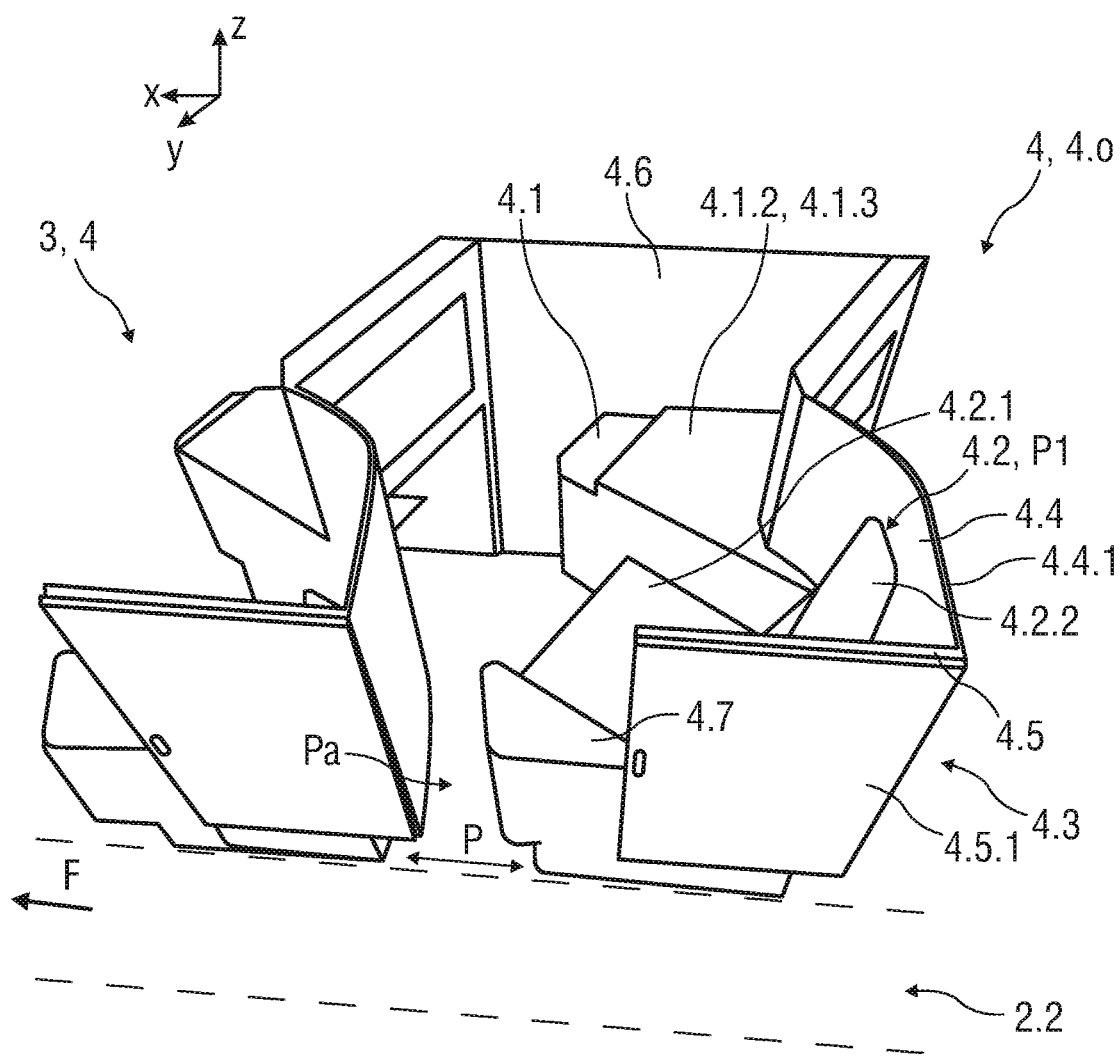

FIGS. 7A to 7B are each showing a perspective view of embodiments of the angled seat units 4 of the passenger seating arrangement 1. In particular, FIG. 7A shows the angled seat unit 4 comprising an inwardly angled seat configuration 4.*i* and FIG. 7B shows the angled seat unit 4 comprising an outwardly angled seat configuration 4.*o*. Each shown angled seat unit 4 can be arranged behind another angled seat unit 4 or behind the forward facing seat unit 3.

According to the adjustable seat 4.2 of the shown angled seat units 4, the seat 4.2 is formed by a seat pan 4.2.1, a backrest 4.2.2 and a leg-rest 4.2.3. Additionally, the seat 4.2 can comprise a head-rest or a leg-rest extension.

For instance, the seat 4.2 can be brought into one or more positions, e.g. into a taxi, take-off, landing position, designated as "TTL" or "TT&L"-position or the seating position P1, an inclined position or the bed position P2. Particularly, in the bed position P2 the seat pan 4.2.1, the backrest 4.2.2 and the leg-rest 4.2.3 are brought into a substantially flat, horizontal position.

Each of the shown angled seat units 4 comprises a furniture structure 4.3 having at least a partition wall 4.4 to separate several seat units 3, 4 from each other. In particular, the partition wall 4.4 is a wall arranged behind the seat 4.2 and the console 4.1 and separates them in the longitudinal direction of the cabin 2. On a rear surface 4.4.1 of the partition wall 4.4, which faces towards a rear passenger seated behind, a monitor or screen can be attached. The monitor or screen can at least provide information or entertainment to the rear passenger.

Furthermore, the furniture structure 4.3 comprises a privacy wall 4.5 on the aisle 2.2 bordering side of the angled seat units 4. In the shown embodiments, the privacy wall 4.5 is coupled to the partition wall 4.4. The privacy wall 4.5 can comprise a movable privacy door 4.5.1 at least partially closing the pitch P providing the passenger access Pa.

Additionally, the furniture structure 4.3 can comprise a movable or fixed privacy screen 4.6. The privacy screen 4.6 is arranged on an opposite side of the privacy wall 4.5.

The console 4.1 of each of the angled seat units 4 comprises the footwell 4.1.1 for the passenger seated behind. In particular, the console 4.1 comprises an open space at a rear side facing towards the passenger seated behind, such that the footwell 4.1.1 is accessible for the rear passenger. For instance, the adjustable seat 4.2 can be brought into the bed position P2, such that the seat 4.2 is partially projecting into the footwell 4.1.1.

Further, the console 4.1 comprises a utility surface 4.1.2 for a corresponding passenger of the angled seat unit 4. The utility surface 4.1.2 for the corresponding passenger is provided by an upper surface 4.1.3 of the console 4.1. For example, the utility surface 4.1.2 can comprise at least one of a shelf, a table-top, storage space and storage area. Additionally, the utility surface 4.1.2 can comprise service and/or operational elements, such as switches and HMI-panel to control operable features of the angled seat unit 4.

According to an additional embodiment, the console 4.1 can comprise a not further shown support surface portion which is fixed inside the footwell 4.1.1. When the seat 3.2, 4.2 of the rear passenger is brought into the bed position P2, this seat 3.2, 4.2 can come into contact with the support surface portion of the footwell 4.1.1. Particularly, a sleeping surface is extended for the rear passenger. Further, the support surface portion within the footwell 4.1.1 can provide a shape corresponding with the seat 4.2 of another outwardly or inwardly angled seat configuration 4.*o*, 4.*i* or with the seat 3.2 of the forward facing seat unit 3 in the bed position P2.

As exemplary shown in the FIGS. 7A, 7B, the angled seat unit 4 can comprise at least an armrest 4.7 arranged next to the seat 4.2. Thereby, the armrest 4.7 can be movable such that at least an extended sleeping surface is created when the armrest 4.7 is in a stowed position. In particular, the armrest 4.7 is arranged at a same height as the seat 4.2 in the bed position P2. Additionally, the armrest 4.7 can provide a storage space for the passenger.

Figure 8:
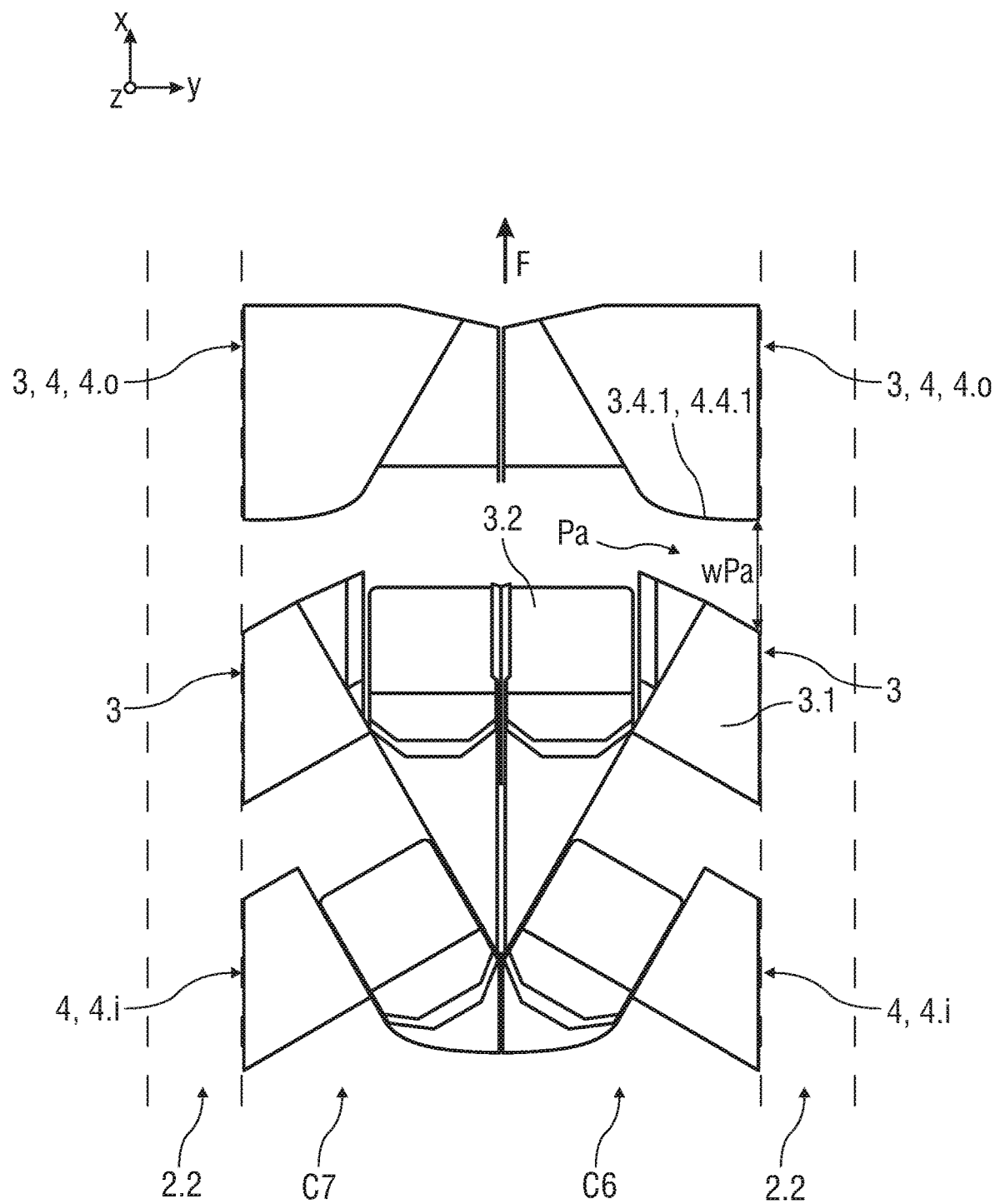

FIG. 8 shows a top view of an embodiment of the seat units 3, 4 arranged behind another within each center column C6, C7.

Particularly, in front of the forward facing seat unit 3 another forward facing seat unit 3 or an angled seat unit 4 with an outwardly angled seat configuration 4.o can be positioned.

The console 3.1 of the forward facing seat unit 3 comprises a front surface 3.1.4 which is horizontally curved-shaped or bent-shaped. Particularly, the passenger access Pa is provided between the rear surface 3.4.1, 4.4.1 of the partition wall 3.4, 4.4 in front of the forward facing seat unit 3 and the front surface 3.1.4 of the console 3.1. As a result of the horizontal shape of the front surface 3.4.1, the front surface 4.1.4 and the rear surface 3.4.1, 4.4.1 diverge in a direction towards the aisle 2.2. Therefore, a width wPa of the passenger access Pa between the forward facing seat unit 3 and its front seat unit 3, 4 is expanding in a direction towards the aisle 2.2.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A passenger seating arrangement for a vehicle cabin comprising a first set of a plurality of seat units, wherein:
   the seat units of the first set of the plurality of seat units are arranged in a first column consecutively one behind another along a longitudinal direction of the vehicle cabin,
   each seat unit of the first column comprises a side bordering an aisle of the vehicle cabin,
   each seat unit of the of the first column comprises at least one console and one seat arranged adjacent to the console,
   each seat unit of the of the first column is one of a forward facing seat unit having a longitudinal axis of a forward facing seat that is parallel to the longitudinal axis of the vehicle cabin, and is one of an angled seat unit having a longitudinal axis of an angled seat that is angled relative to the longitudinal axis of the vehicle cabin, and
   wherein the first column has a front section and a center section, the front section having at least one forward facing seat unit;
   wherein a forward facing seat unit of the front section is followed by at least one angled seat unit of the center section such that the angled seat of the at least one angled seat unit of the center section following the forward facing seat unit of the front section is arranged directly behind the forward facing seat of the forward facing seat unit and the console of the at least one angled seat unit of the center section following the forward seat unit of the front section is directly behind the console of the forward facing seat unit.

2. The passenger seating arrangement according to claim 1, wherein the first column has a forward facing seat unit that is arranged in a very first front row of the front section.

3. The passenger seating arrangement according to claim 1, wherein several forward facing seat units are arranged consecutively behind each other in the front section.

4. The passenger seating arrangement according to claim 1, wherein the forward facing seat and the console of each consecutive forward facing seat unit are arranged in a staggered manner such that the forward facing seat and console alternate in position along the aisle when several forward facing seat units are arranged behind each other.

5. The passenger seating arrangement according to claim 1, wherein the console of each seat unit comprises at least a footwell for a passenger seated behind and a utility surface for a corresponding passenger of the seat unit.

6. The passenger seating arrangement according to claim 1, wherein several angled seat units are identically angled and arranged behind each other in the center section.

7. The passenger seating arrangement according to claim 1, wherein the first column includes forward facing seat units that alternate between the angled seat units.

8. The passenger seating arrangement according to claim 1, wherein the angled seat units comprise two different configurations, an outwardly angled seat configuration and an inwardly angled seat configuration depending on an orientation of the seat with respect to the aisle.

9. The passenger seating arrangement according to claim 8, wherein each angled seat is positioned at an angle of about 30° to 50°, preferably 45°, with respect to the aisle.

10. The passenger seating arrangement according to claim 1, wherein the forward facing seat and the angled seat fare arranged behind each other on the same side with respect to the aisle.

11. The passenger seating arrangement according to claim 1, wherein the seat units are distanced from each other by a pitch providing a passenger access.

12. The passenger seating arrangement according to claim 1, wherein a width of a passenger access between two seat units is expanding in a direction towards the aisle.

13. A vehicle cabin comprising a passenger seating arrangement according to claim 1.

14. The vehicle cabin according to claim 13, wherein at least two columns and at least one aisle between the columns are provided within the vehicle cabin.

15. The vehicle cabin according to claim 13, wherein at least two center columns and two outer columns are provided within, wherein each of the center columns comprises a number of angled seat units with inwardly angled seat configurations depending on an orientation of the seat with respect to the aisle providing a direct passenger access to each seat unit from the aisle, and wherein each of the outer columns comprises a number of angled seat units with inwardly or outwardly angled seat configurations.

16. The passenger seating arrangement for a vehicle cabin according to claim 1, further comprising a second set of a plurality of seat units arranged differently than the first set of the plurality of seat units.

17. The passenger seating arrangement according to claim 1 wherein the console of the angled seat unit of the center section following the forward facing seat unit of the front section is at the aisle and the angled seat is angled toward the aisle.

18. The passenger seating arrangement according to claim 1 wherein the angled seat of the angled seat unit of the center section following the forward facing seat unit of the front section is at the aisle and the angled seat is angled away from the aisle.

* * * * *